United States Patent [19]

Kwech et al.

[11] 4,102,700

[45] Jul. 25, 1978

[54] PROCESS FOR THE PRODUCTION OF A MIXTURE TO BE UTILIZED IN THE PRODUCTION OF BUILDING MATERIALS AND A DEVICE FOR CARRYING OUT THE PROCESS

[75] Inventors: Ludwig Kwech, Kaltenleutgeben; Fritz Jung, Vienna, both of Austria

[73] Assignee: Perlmooser Zementwerke Aktiengesellschaft, Vienna, Austria

[21] Appl. No.: 717,884

[22] Filed: Aug. 26, 1976

[30] Foreign Application Priority Data

Aug. 27, 1975 [AT] Austria .................................. 6604/75

[51] Int. Cl.² .................................................. C04B 7/02
[52] U.S. Cl. ..................................... 106/100; 106/103; 106/118
[58] Field of Search ................. 106/89, 100, 102, 103, 106/118

[56] References Cited

U.S. PATENT DOCUMENTS

| 2,438,488 | 3/1948 | Anderson et al. .................... 106/100 |
| 3,645,762 | 2/1972 | Mikoteit et al. ....................... 106/89 |

*Primary Examiner*—J. Poer
*Attorney, Agent, or Firm*—Holman & Stern

[57] ABSTRACT

The present invention provides a method for producing a mixture of materials of differing compositions, particularly a mixture comprised of two burned, sintered, calcined, and/or heated inorganic components, the first of said components being subjected to a heating process, particularly a burning process, and the second and other components being heated to a temperature below the temperature to which the first component has been heated.

4 Claims, 11 Drawing Figures

FIG_8  FIG_9

FIG_10

FIG. 11

PROCESS FOR THE PRODUCTION OF A MIXTURE TO BE UTILIZED IN THE PRODUCTION OF BUILDING MATERIALS AND A DEVICE FOR CARRYING OUT THE PROCESS

BACKGROUND AND SUMMARY OF THE INVENTION

The invention relates to a process for the production of a mixture to be utilised, for instance, in the production of building materials and comprising at least two burned and/or sintered and/or calcined and/or heated inorganic components of different composition, the first of said components being subjected to a heating process, in particular a burning process, and the second or other component(s) being heated to a temperature below the heating temperature of the first component, and a device for carrying out the process according to the invention.

In many branches of industry, — no claim to completeness is made in mentioning the refractory, ceramics and building materials industries 13 products composed of two or more materials of different composition are produced. In most cases, these products or their components are formed of themost diverse starting materials by means of heating and/or calcining and/or fritting and/or sintering and/or melting processes, general mention being made here of the production of cement clinkers. These heating processes generally require large amounts of caloric energy — in the light of rising energy costs, the application of energy-saving measures in carrying out the processes in the preceding branches of industry is a matter of urgent concern.

Just to give an example, it is known that the burning of Portland cement clinker requires temperatures which generally range in an order of magnitude of 1400° to 1450° C. The large amount of heat present in the clinker due to its burning process must be removed from the clinker after leaving the burning zone of the burning kiln, which is generally a rotary kiln, in suitable cooling means such as grate-, rotary-, shaft- or planetary coolers. The heat taken from the clinker is utilised, a.o., for heating the combustion air supplied to the burner. There is often no possibility of utilising or applying the remainder of the heat.

The present invention represents an essential contribution to the solution of the problem of reducing energy requirements, particularly in the branches of industry mentioned above, for the event that one or more of the components of a two- or multi-component mixture (for instance of a binder mixture) is (are) obtained from a starting material for the first component which is heated to relatively high temperatures, while the starting material(s) for the other component(s) is (are) heated to temperatures which are lower in comparison to the heating temperatures of the first component.

The process according to the invention of the type initially mentioned comprises the improvement that under utilisation of the heat applied in the heating process, (for instance, in a burning process), of the first component to be heated to higher temperatures or of the heat liberated in the cooling of the first component, the starting materials for the other component(s) which is (are) to be heated to lower temperatures as compared to the first component, are added to or admixed with the first component which has already been heated and preferably is leaving the heating-, in particular the sintering or burning zone of a heating means, thus establishing an intimate contact within the area of the cooling zone of the process, that is the zone extending before, during and/or after entry of the first hot component into a cooling means downstream of the heating means. But in the event that more than one other component is to be added, these components can be added in two or all three of the zones indicated above.

Components are understood to mean materials of the most diverse nature, i.e. chemical substances, mixtures of substances, physical blends, multi-phase systems and/or other heterogeneous materials.

The "cooling zone of the process" is understood to mean the following: it starts there in the heating zone (burning kiln) where the first component has passed the maximum temperature on its way through the kiln and extends over the transition zone between burning kiln and cooling means and into the cooling means up to the end of the cooling means or cooling process, respectively.

In addition to the advantages mentioned, the combination of the product streams of first heated component and added further components during production beings with it a considerable streamlining and improved economy over the separate production processes used for the production of the individual components up to now.

It is possible to charge the entire amount or only part of the starting materials for the other component(s) to be heated to lower temperatures into the cooling zone of the process provided according to the invention. A remaining part can be added to the first component even prior to its being subjected to the heating process and can be treated at higher temperatures or, after having been subjected to a separate heating process, can subsequently be added to the mixture according to the invention of at least two components. As already mentioned, parts of the starting materials to be heated can be added in several of the zones indicated above.

Application of the process according to the invention is particularly advantageous where the starting materials for the first and/or the other component(s) are formed of materials which are to be subjected to an intended conversion process by means of heating.

By the addition of the starting materials for the other component(s) which are to be heated to lower temperatures as compared to the first component — to be called "starting materials" for short in the following — to the hot first component as provided for according to the process of the invention, an intimate contact of the materials and thus a very effective transition of the heat energy stored in the first component from the first burning process to the starting materials which are generally charged in a cold state into the area of the end of the heating process, for instance of a burning kiln, is achieved. As a result and as intended, the freshly heated first component, for instance a freshly burned Portland cement clinker of conventional composition, is cooled off before, during or after its entry into or transition to the cooling means, (which in the case of Portland cement clinker is a clinker cooler), as a result of its contact with the cold starting materials, while the starting materials for the other component(s) are heated to the intended temperatures. In many cases, such as when producing Portland cement clinker or burning lime, a rapid cooling off of the first component is desirable and can easily be effected according to the invention. Due to the intimate heat exchange with the starting materials for the other component(s), wear on the cooling zone as defined above, regardless of whether it is located in the discharge part of the kiln or formed by a cooling means, is essentially reduced and the efficiency of the cooling zone is materially raised. Just to give an example, the kiln exit temperatures of Portland cement clinker of conventional composition are about 1300° C. Moreover, due to the intensive transfer of heat energy from the hot first component to the starting materials for the other component(s) by selection of the site of addition, heating of the latter component(s) or parts thereof in a separate process or processes can be totally omitted.

The process according to the invention, which combines two different heating operations into one single process, makes possible a substantial reduction of energy requirements, technical equipment, operating personnel and thus, of expenditure.

In the following, particularly preferred embodiments of the process according to the invention are described. In cement production, it is of advantage to produce a building material mixture comprising at least two components of different composition, one of which is a Portland cement clinker of conventional composition, while the other component(s) is (are) to be heated to a temperature below the burning temperature of the Porland cement clinker. The production process comprises the improvement that the starting material(s) intended for the component(s) to be heated to lower temperatures as compared to the burning temperature of the Portland cement clinker is (are) added to or admixed with the hot Porland cement clinker of conventional composition leaving the burning or sintering zone of the burning kiln before, during or after its entry or transition into a cooling means formed by a clinker cooler. The freshly burned hot Portland cement clinker of conventional composition serves as the primary hot substance from which heat energy is transferred to the starting material(s) for the other component(s) and there effects the intended conversion processes.

Suitable starting material(s) for the component(s) which is (are) to be heated to lower temperatures as compared to the heating temperature of the first component, according to the invention and a particularly preferred embodiment of the process of the invention, is (are) material(s) which become(s) hydratisable as a result of the heating process. These materials are marl clinker raw materials selected from the group comprising marls, lime marls, dolomitic marls, argilliferous marls, marl slates, shales, calciferous clays, argilliferous limes, phyllites, lime phyllites, ultramafic rocks and waste products which are similar in their composition to the materials enumerated.

The chemical composition (empirical formula) of the marl clinker raw materials enumerated above can vary within a wide range. Marl clinker raw material, just like conventional Portland cement raw meal, mainly consists of compounds of silicic acid, alumina, ferric oxide and lime, but is of lower calcium content than conventional Portland cement raw meal.

"Hydratisable" is understood to mean that the products or compounds formed in the marl clinkers as a result of the heating by the first hot component are capable of reacting with water to form compounds resistant to attack by water, the hydraulicity optionally being stimulated or enhanced in a manner known per se by means of alkaline and/or sulfatic substances. The hydratisable substances differ by this inherent hydraulicity from substances such as, for instance, certain silicic acid modifications (opal) or kaolin, whose structure is merely opened by means of heating and which are thus capable of reacting with calcium hydrate only. In characterising the new formations formed in the marl clinkers, it should be noted that they contain compounds which contain substantially less CaO as compared to Portland cement clinkers of conventional composition, particularly ternary compounds of low calcium content on the basis of $SiO_2$, $Al_2O_3$, CaO, ($Fe_2O_3$), calcium silicates of low calcium content and calcium aluminates of low calcium content. If, for instance, Portland cement clinker of conventional composition is used as the first component, mixed clinkers are obtained which when processed into cements often even surpass the Portland cement clinker in their final properties, such as strengths.

Due to the burning temperature of the marl clinker which is low in comparison to the burning temperature of the Portland cement clinker of conventional composition, it is possible to use dolomitic marls with MgO contents substantially higher than those admissible up to now in Portland cement clinker production without detrimental effects due to magnesia expansion on the concrete produced from this cement.

According to a further embodiment of the process according to the invention, it is possible to use as the first component heated to higher temperatures conventional limes, marl limes or dolomitic limes which are subjected to a burning process and converted to white (fat)limes, water limes or (highly) hydraulic limes at temperatures within a range of about 1100° to 1200° C.

Preferred as suitable starting materials for the other component(s) to be heated to lower temperatures to be added to the hot burned limes are the marl clinker raw materials mentioned above. They are heated to the desired temperatures by contact with the decarbonated lime leaving the burning zone.

The product or mixture of at least two components of different composition thus obtained is suitable for the production of plaster and masonry binders, but also of mixed binders of high quality and, due to the particular qualities of the marl clinker share, is of high suppleness and good workability. Good workability and high yield can be further increased by additions known per se such as air entraining agents, cellulose derivatives or similar additions.

To the hot first component mentioned above, e.g. hot Portland cement clinker of conventional composition, not only marl clinker raw materials but also the starting materials for the other component(s) described in detail in the following of the mixture according to the invention for the production of building materials can be added in the respective(cooling)zone of the process in the same way as addition to the hot Portland cement clinkers of conventional composition or burned lime is effected. To the mixture thus obtained, further components can be added in order to obtain commercial building materials. The lasting advantage in this is the energy saving made possible by the combined heating-cooling process according to the invention.

It should be mentioned here that it is of course possible within the wide framework of the invention to use as the first component(s) to be heated to higher temperatures those substances which have been described or still are to be described in the following as the "second" or "other" components added to the first components. In this case, for instance, marl clinkers burned from the marl clinker new materials previously mentioned as the starting materials for the other component(s) can be used as the first (hotter) component for heating starting materials for substances to be heated to lower temperatures to the respective desired temperature. For example, the marl clinker hot from the burning process can be used to expand perlite or slate as the other component.

According to a further preferred variant of the process according to the invention, materials to which pozzuolana properties are imparted by the heating process can be used as the starting materials for the other component(s) (to be heated to lower temperatures). These particularly include materials of silicate and/or aluminate quality selected from the group comprising silicic acid modifications, felspars, argilliferous materials which can be used for the production of bricks, oil shale residues, bauxites, laterites, trasses, volcanic extrusive rocks, glasses and substances which already possess pozzuolana qualities. It was found that the pozzuolana properties of most natural and artificial pozzuolanas can be essentially enhanced by the new type of heat treatment according to the invention.

A further embodiment of the process according to the invention provides starting materials for the other component(s) which expand during the heating process and thus decrease their apparent density so that they can serve in the product comprising at least two components of different composition as, for instance, concrete lightweight aggregates, bulk material or for heat insulation purposes. Such starting materials particularly are clay with a propensity to expansion,(expansible clay,-)expansible slate (shale), expansible perlite, expansible tuff, expansible vermiculite or other expansible materials.

Finally, it becomes possible according to the process of the invention to use as starting materials substances which have a detrimental effect on quality, but lose this deteriorating effect as a result of the heating process and thus make possible their utilisation in connection with Portland cement clinker of conventional composition. Such materials which might be detrimental to quality but lose their deteriorating effect during the burning process are materials susceptible to combustion, to conversion to the gaseous state, to conversion to vapour, to chemical reaction or to any other change in the course of the heating process. Examples for such compounds are fly ashes with a high content of sulfur compounds or combustible components which cannot be used as cement grinding additions at the present time due to these deteriorating properties.

In the process according to the invention, the starting materials can be added to the first component, which, as already mentioned, can be a Portland cement clinker of conventional composition, in a coarse state, in particles of about 5 to 30 mm, preferably 10 to 20 mm grain size. In this case, the surface of the starting materials is generally heated quicker and to higher temperatures than the inside of the particles. When the proper temperature range is adjusted by selection of the place of addition within the cooling zone of the process, the surface of the particles will be denser and more abrasion-resistant after heating than the inside of the particles. This can mean an essential reduction of possible undesirable comminution or formation of dust due to abrasion.

According to a preferred variant of the process of the invention, the starting material(s) for the other components, particularly in the case of the addition of marl clinker raw materials, are added to the first hot component, which can be a Portland cement clinker of conventional composition, fast and/or at comparatively high temperatures, whereby due to the rapid cooling off of the first component, which is particularly important in the case of Portland cement clinker of conventional composition, this component is improved in its quality and the other component(s), particularly in the case of marl clinker raw materials, due to the fast heating is (are) provided with an outer layer which is higher burned and more abrasionresistant as compared to the inside of the particles. A fast addition has similar favourable effects, for instance, on the various expansible materials indicated above.

A regulation of the temperature to which the starting materials of the other component(s) are heated by contact with the hot first component can be achieved, on the one hand, by the amount of starting materials added and, on the other hand, by selecting the site of addition within the cooling zone. If, for instance, a low heating temperature of the starting materials is intended, such as in the case of expansible materials, these substances will be added immediately prior to or at the entry of the stream of the first hot component into the cooling zone of immediately into the cooling zone. In this case, a comparatively large amount will be added. If the heating temperature of the starting material(s) of the other components is to be high, a small amount will be added or these starting materials will be added to the first hot component, for example, hot Portland cement clinker, either still within the heating zone, e.g. in the burning zone, or immediately after its leaving the heating zone, e.g. the burning zone. The weight ratio of first and other component(s) can vary within a wide range.

When a mixture of Portland cement clinker and marl clinker is produced, an addition ratio (related to weight) of marl clinker raw materials to Portland cement clinker of conventional composition of 1 : 1 to 1 : 25, particularly of 1 : 2 to 1 : 25, is established. Particularly favourable results, especially in respect to economy at simultaneous achievement of high strengths, can be obtained with weight ratios of 1 : 4 to 1 : 10 (each marl clinker to Portland cement clinker of conventional composition). The cements thus produced are similar to Portland cements, but superior to those in respect to workability and other properties.

The addition of the starting materials into the range of the or after the heating zone, for instance at the discharge end of the kiln or before or at the entry of the first substance into the cooler, can be effected in the most diverse ways, for instance by mechanical or pneumatic conveying such as throwing, propulsion or blowing.

A further object of the invention, for producing the mixture and for carrying out the process explained in detail above, is a device which comprises a heating means, particularly a burning kiln, for instance in the form of a shaft kiln, a rotary tubular kiln or a fluidized bed kiln, for heating the starting materials for the first component, a cooling means and preferably a transition means arranged between the discharge end of the heating means and the adjacent cooling means (formed, for instance, by a clinker cooler). This device according to the invention is so embodied that a feeding means for the addition of the starting materials for the other component(s) is provided).

According to the invention, the discharge end of the feeding means is arranged within the area of the cooling zone of the process.

The discharge end of the feeding means, depending upon the temperature to which the starting materials mentioned above are to be heated, can be arranged within that part of the cooling zone still within the kiln, i.e. within the area of the end of the kiln, within the transition means or within the cooling means. But in some cases, the starting materials can also be added by means of more than one feeding means each arranged in the respective places.

It is of advantage to use a conveyor screw as a feeding means.

Particularly simple of construction and easy to operate is a stationary conveying organ. This can be a chute, a feed pipe (gravity tube) of any given cross section, but also a slide or a gutter.

The feeding means can also have the form of a hood arranged on the shell of the discharge end of a rotary kiln or on the shell or a rotary tubular cooler and of a shovel-shaped fixture penetrating this shell and leading into the interior of the cooler.

If, for example, a chute is used for charging the starting materials for the other component(s) for instance into the area of the discharge end of the kiln, an intimate mixing of the hot first component and said starting materials is effected still within the discharge end of the kiln due to rotation of the kiln when a rotary tubular kiln is used.

Preferred is a device according to one of the embodiments described above, said device having feeding means for the addition of the starting materials for the other component(s) adjacent the transition means arranged between kiln and cooling means under interposition of at least one sealing means.

Sealing means according to the invention, particularly for a gas-tight charging of the raw materials into the desired area of the cooling zone, are preferably double pendulum flap valves or cellular wheel sluices.

When the rotary kiln is provided with planetary coolers, the present invention provides for a preferred embodiment in which the feeding means or the discharge end thereof leads to the area of the feed openings from the rotary kiln to the coolers, so that the addition of the starting raw materials for the first component is effected in the area of the feed openings from kiln to cooler.

A further preferred embodiment of the invention is a device comprising at least one coil or screw wing built into the inside of the shell of the kiln and turning together with the kiln shell, said coil(s) or screw wing(s) conveying the starting materials for the other component(s) — which are charged at the discharge end of the kiln — to the feed openings from the rotary kiln to the planetary coolers. If several coils or screw wings are provided, their discharge ends can be arranged in such a manner that they each convey the starting materials to one particularly selected feed opening of the planetary coolers. This is of particular advantage if the share of other component(s) to be heated is relatively small and the raw materials are not to be heated to very high temperatures. Further, in addition to secure conveying of the starting materials for the other component(s), it is preferred that the discharge end of the rotary kiln be conically shaped and that this part of the kiln shell thus be of an inclination compensating for the slant of the kiln, the starting materials for the other component(s) charged at the end of the kiln, for instance marl clinker raw materials, thus being conveyed to the food openings of the planetary coolers.

In view of the regulation of the amount of starting materials added and thus of the control of the temperature to which the starting materials are heated, it is particularly preferable to use a device which is characterized in that the feeding means for the addition of said starting materials is connected to the kiln or the transition means under interposition of at least one metering means.

The invention is described in detail in the following by means of embodiments of devices according to the invention for carrying out the process according to the invention under reference to the accompanying drawings in which

BRIEF DESCRIPTION OF THE DRAWINGS

FIG. 3 is a section along line III—III in FIG. 2, FIG. 4 a view enlarged in comparison to FIG. 1 of the discharge end of a rotary kiln in which said starting materials are charged into the transition means between the rotary kiln and the cooling means, FIG. 5 a section along line V—V in FIG. 4, FIG. 6 a view enlarged in comparison to FIG. 1 of the discharge end of a rotary kiln in which said starting materials are charged into the rotating part of the cooling means arranged downstream from the rotary kiln, FIg. 7 a section along line VII—VII in FIG. 6, FIG. 8 a partly sectional view enlarged in comparison to FIG. 1 of the discharge end of a rotary kiln in which said starting materials are charged by means of a gravity tube or a chute directly into the rotating kiln in which always the first (hot) component is moved, FIG. 9 a section along line IX—IX in FIG. 8, FIG. 10 a section enlarged in comparison to FIG. 1 through the discharge end of a rotary kiln provided with planetary coolers in which the starting materials for the other component(s) are charged within the area of the feed openings of the planetary coolers and FIG. 11 a partly sectional, diagrammatic view of a shaft kiln plant for carrying out the process according to the invention.

DESCRIPTION OF THE PREFERRED EMBODIMENTS

Identical reference numbers are used for the corresponding parts in the figures.

Figure 1:
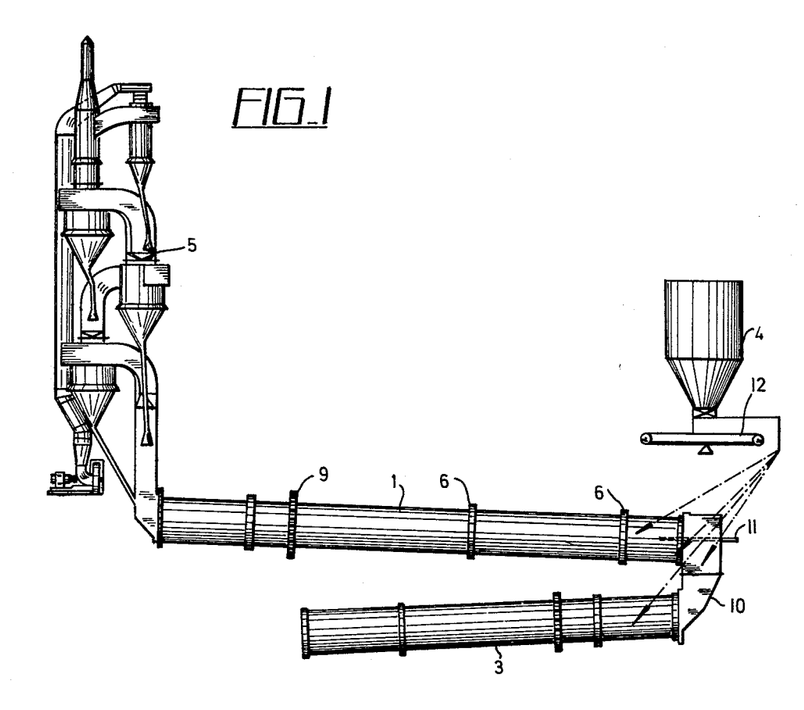
FIG. 1 is the diagrammatic view of a rotary tubular kiln plant for carrying out the process of the invention in which the places most frequently used for the addition of the starting materials for the second component(s) are indicated.

The rotary kiln plant for carrying out the process of the invention shown in FIG. 1 essentially comprises the rotary kiln 1 proper, a charging means for the kiln charge (starting material for the first component), a cooling means 3 for the burned material arranged downstream from the rotary kiln, a feeding means 4 for the addition of the starting materials for the other component(s) and aheat exchanger plant 5 for heating the starting materials for the first component, for instance a cement raw meal, by means of the hot kiln exhaust gases. The type of heat exchanger shown in FIG. 1 can of course be replaced by a Lepol grate preheater or by an extension of the rotary kiln by means of a calcining and drying zone.

The rotary kiln 1 is arranged in a manner known per se with a slight horizontal inclination and provided with riding rings 6 supported via rollers 7 in bearings 8 (FIGS. 2, 4, 6, 8). The rotary kiln is driven by means of a motor and gear not shown in detail, the motor driving a gear rim 9 which is in torsion-tight connection with the rotary kiln.

To the rotary kiln 1, the cooling means 3 for the burned material is connected via an interposed transition means 10. The transition means 10 at the same time serves as a support for the burner 11 for the rotary kiln 1 and forms a gravity shaft through which the burned material discharged from the rotary kiln 1 is conveyed to the cooling means 3. The cooling means 3 can optionally comprise a rotary cooler (FIGS. 2 to 7), a grate cooler (FIGS. 8, 9), a shaft cooler or a planetary cooler (FIG. 10). If a planetary cooler is used, it is driven by a motor (not shown).

Within the area of the cooling zone of the process, the starting materials for the other component(s) are charged by means of the feeding means 4. Just as shown in FIG. 1 with broken lines, the feeding inlet can optionally be arranged in the discharge end zone of the rotary kiln itself (FIGS. 2, 3 and 8, 9), in the transition means (FIGS. 4, 5), in the feed end zone of the cooling means (FIGS. 6, 7), or in a conically shaped discharge end of the rotary kiln (FIG. 10). The connection of the feeding means 4 to the cooling zone of the process is preferably effected via an interposed metering means 12. The metering means 12 can comprise a belt weigher, for instance.

Figure 2:
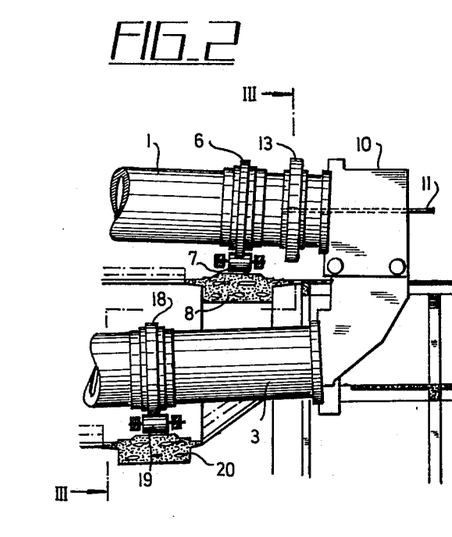
FIG. 2 is an enlarged view of the discharge end of a rotary kiln in which said starting materials are charged directly into the rotating part of the rotary kiln within the area of its discharge end.
Figure 3:
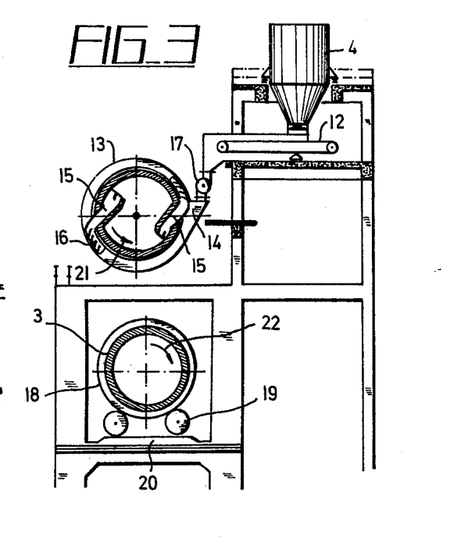

In the embodiment according to FIG. 2 and 3, the feeding inlet for the starting materials for the other component(s) is arranged, as already mentioned, immediately within the discharge end zone of the rotary kiln 1. The feeding means 4 and the metering means 12 are arranged laterally and spacially above the discharge end zone of the rotary kiln 1 which is surrounded on a short part of its length by a hood 13 with tangential inlet opening 14. The rotary kiln 1 is provided in the area within the hood 13 with two diametrically opposed openings 15 to which are connected shovel-shaped fixtures 16 projecting into the hood 13 and extending into the interior of the rotary kiln and rotating together with the rotary kiln 1. The inlet opening 14 of the hood 13 is connected to the discharge side of the metering means 12 via an interposed locking and/or sealing organ 17 in the form of a cellular wheel sluice.

The cooling means 3 in the form of a rotary cooler is provided in a manner similar to that of the rotary kiln 1 with a riding ring 18 supported via rollers 19 on a bearing 20 (FIG. 2 to 7). The rotating direction of the rotary kiln 1 is indicated by means of arrow 21 and the rotating direction of the rotary cooler 3 is indicated by means of arrow 22.

In the embodiment according to FIG. 2 and 3, the starting materials for the other component(s) charged by the feeding means 4 are thus charged into the hood 13 via the metering means 12, the locking and/or sealing organ 17 and the tangential inlet opening in the hood 13, they are then taken up by the shovel-shaped fixtures 16 and conveyed through openings 15 to the interior of the rotary kiln 1 where they come into contact with the hot first component.

Figure 4:
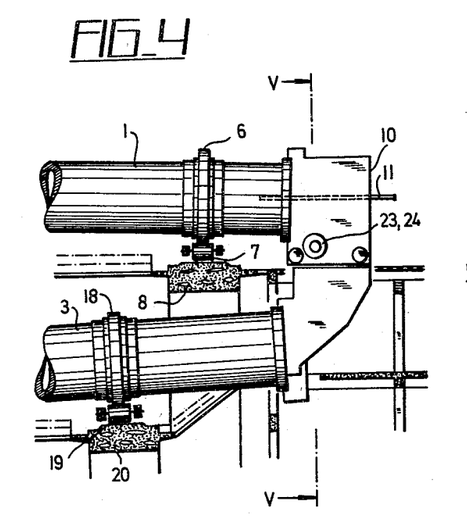
Figure 5:
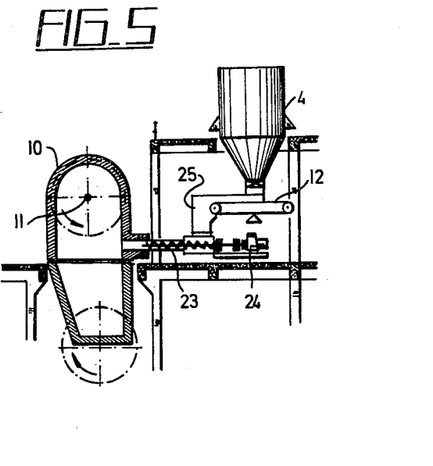

In the embodiment according to FIG. 4 and 5, the feeding means 4 for the addition of the starting materials for the other component(s) comprises a conveyor screw 23 whose discharge end, as already mentioned, empties into the transition means 10 between the rotary kiln 1 and the cooling means 3 again having the form of a rotary cooler. The conveyor screw 23 has the form of a socalled damming screw, i.e. the raw materials charged are dammed up and form a plug serving as an air-tight seal in the zone of the discharge end of the screw 23. The feeding hopper of the screw 23 bears the reference number 25. The flow of material again passes via the metering device 12 in the form of a belt weigher to the charging end of the screw 23 driven by a gear motor 24 and is conveyed by means of the screw 23 to the transition means 10. The screw 23 is arranged in a plane essentially transverse to the axis of rotation of the rotary kiln 1, so that the marl clinker raw materials are charged directly into the material dropping from the discharge end of the rotary kiln 1.

Figure 6:
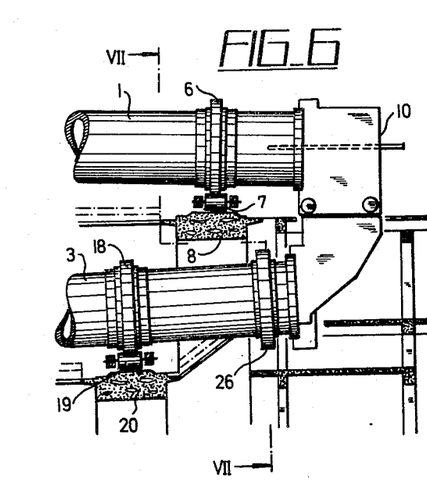
Figure 7:
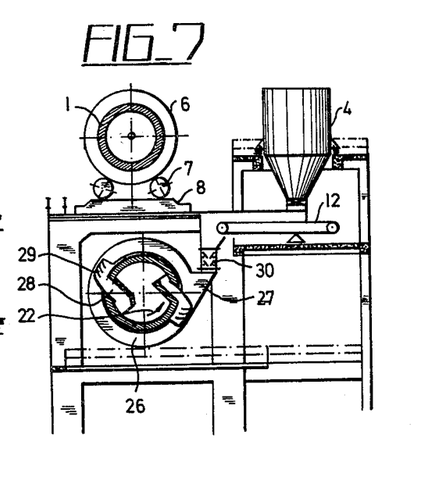

In the embodiment according to FIG. 6 and 7, the charging orifice for the starting raw material is arranged on the intake end of the rotary cooler 3 and is formed essentially as shown in FIG. 2 and 3. The feeding means 4 and the metering means 12 are arranged laterally and spacially next to the rotary cooler 3 which is surrounded on a short part of its length by a hood 26 with tangential intake opening 27. The rotary cooler 3 is provided within the area inside of its hood 26 with two diametrically opposed openings 28 connected to which are shovel-shaped fixtures 29 projecting into the hood 26, extending into the interior of the rotary cooler 3 and rotating together with the rotary cooler. The intake opening 27, whose axis is directed essentially vertically upwards, is connected via an interposed sealing means 30 in the form of a double pendulum sluice with the discharge end of the metering means 12. The double pendulum sluice or flap valve comprises two spacially arranged sealing systems one of which is always open when the other one is closed, so that in each operation, only the material present at that time between the two sealing systems can pass into the tangential intake opening 27 of the hood 26. The starting material for the other component(s) charged by the feeding means 4 is thus charged via the metering means 12 and the sealing means 30 into the tangential intake opening 27 of the hood 26, taken up by the shovel-shaped fixtures 29 circulating in the direction of the arrow 22 in the hood 26 and passed into the rotary cooler 3 in the course of the cycling motion.

Figure 8:
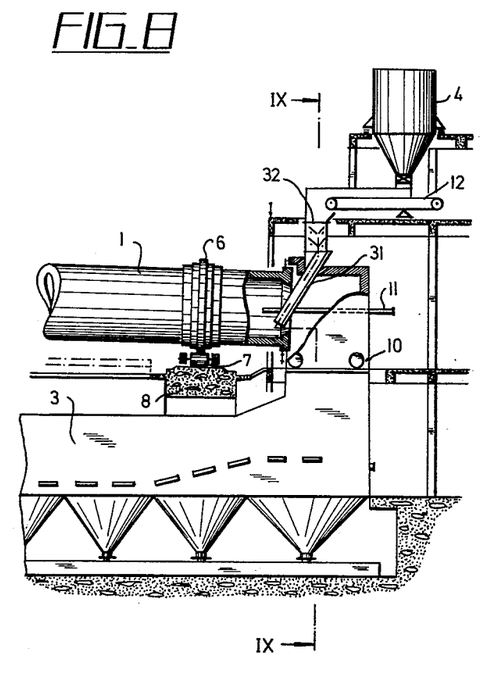
Figure 9:
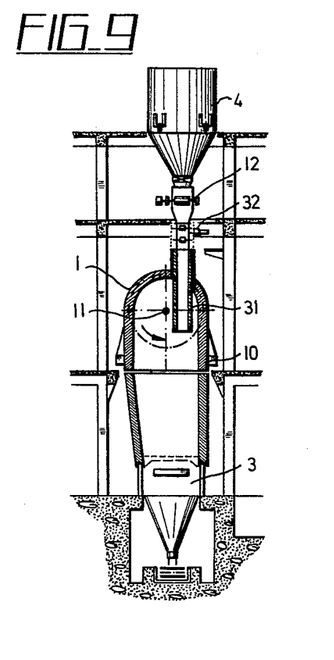
Figure 10:
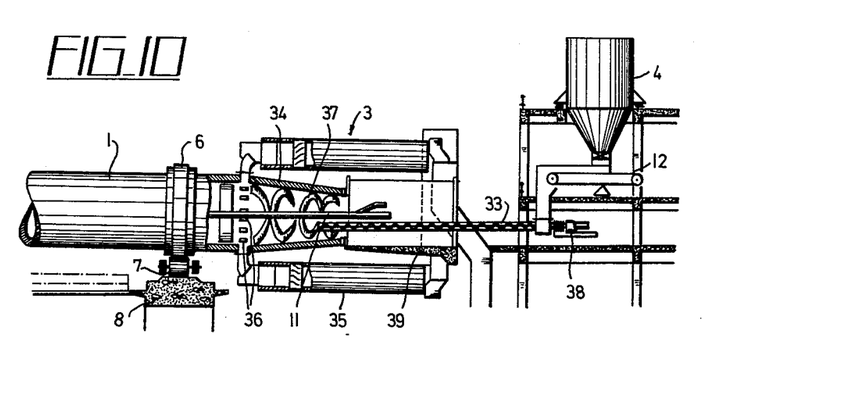

In the embodiment according to FIG. 8 and 9, the feeding means 4 for the addition of the starting raw materials comprises a stationary conveying organ 31 whose discharge end protrudes directly into the discharge end of the rotary kiln 1. The stationary conveying organ 31 can be so embodied that its discharge end is movable in the direction of the axis of the kiln. The conveying organ 31 can comprise a gravity tube, a chute or any other type of slide or gutter vertically or obliquely positioned. The flow of material passes from the feeding means 4 via the metering means 12 and a sealing means 32 which can again have the form of a double pendulum sluice according to FIG. 6 and 7, onto the stationary conveying organ 31 which conveys the starting materials for the other component(s) directly into the discharge end of the rotary kiln 1. In this, the stationary conveying organ 31 penetrates the wall of the transition means 10 and extends in a plane positioned off-center of the axis of rotation of the rotary kiln 1 in order to permit the burner 11 for the rotary kiln 1 to be arranged in the axis of rotation of same. The cooling means 3 adjacent the transition means 10 in this embodiment has the form of a grate cooler.

In the embodiment according to FIG. 10, the starting materials for the components to be heated to lower temperatures are charged by means of the feeding means 4 via the metering means 12 and via a conveying screw 33 into the conically shaped discharge end 34 of the rotary kiln 1. The cooling means 3 downstream from the rotary kiln 1 in this has the form of a planetary cooler, the individual planets spacially arranged on the periphery of the discharge end of the rotary kiln 1 and thus orbiting together with this bear the reference number 35. The orifices for passing the burned material from the rotary kiln 1 to the individual planetary coolers 35 bear the reference number 36. The conically shaped end part 34 of the rotary kiln 1 can be provided with several coils or screw wings 37 which convey the starting materials each to one particular orifice 36 for passing the burned material. The burner 11 for the rotary kiln 1 is again arranged in the axis of rotation of the rotary kiln, while the screw 33 is arranged parallel to this axis of rotation.

The screw 33 is driven by means of a motor 38. A shield 39 pierced by the screw 33 is provided as protection from the radiation heat and against injuries of the operating personnel by the rotating planetary coolers. In this embodiment, the starting raw materials charged by the feeding means 4 via the screw 33 and the coils 37 are conveyed to the passing orifices 36 to the planetary coolers 35 and there brought into contact with the hot first component, for instance a Portland cement clinker of conventional composition discharged from the rotary kiln 1.

Figure 11:
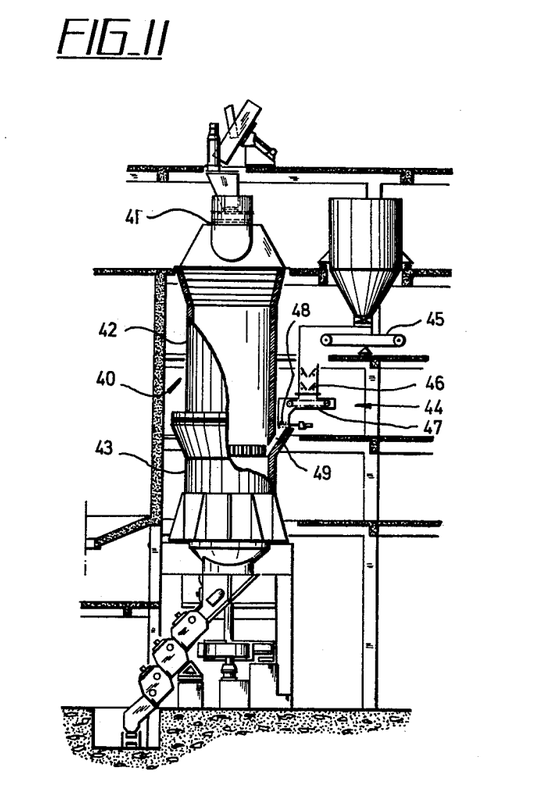

In the embodiment according to FIG. 11, the burning kiln is a shaft kiln 40 comprising a charging means 41 for the starting material for the first component, e.g. limestone, a burning zone 42 and a cooling zone 43. In the transition area between the burning zone 42 and the cooling zone 43, a feeding means 44 comprising a metering means 45 in the form of a belt weigher, a double pendulum sluice 46, a conveying organ 47 and a rotating disk 48 charging the starting materials for the other component(s), for instance marl clinker raw materials, through an opening 49 in the wall of the shaft kiln 40 into the latter is provided. The starting materials for the other component(s) are then brought into contact with the hot first component, for instance decarbonated lime, inside of the shaft kiln.

The devices shown in the individual figures can also be combined or exchanged among one another.

The invention is explained in detail by means of the following Examples covering the production of novel cements.

EXAMPLE 1

In an oil-fired rotary kiln with a capacity of 460 t/day, a Portland cement clinker of the composition 56.9% $C_3S$, 15.3% $C_2S$, 14.0% $C_3A$ and 8.2% $C_4AF$ was burned. Via an opening in the kiln hood, at the level of the operating platform, marl clinker raw materials with a particle size of 12 to 32 mm was charged onto the intake chute to the rotary cooler. (Composition: ignition loss 24.3%, $SiO_2$ 31.3%, $Al_2O_3$ 10.8%, $Fe_2O_3$ 4.5%, CaO 49.8%). There it mixed with the hot Portland cement clinker discharged from the kiln. The charge of marl clinker raw material amounted to 5900 kg/h, so that a weight ratio of Portland cement clinker of conventional composition to marl clinker of about 80:20 resulted. The clinker thus obtained and a control sample of Portland cement clinker free of marl clinker were ground in a cement tube mill (capacity 55 t/h) with a mixture of crude gypsum rock/anhydrite and then tested according to Austrian Cement Standard ON B 3310, with the following results:

|  | Unmixed Portland Cement Clinker | Mixture of Portland Cement Clinker and Marl Clinker |
| --- | --- | --- |
| Normal Consistence in % | 25.5 % | 26.0 % |
| Begin of Setting | 3 h 35 | 3 h 45 |
| End of Setting | 4 h 00 | 4 h 20 |
| Soundness Test | passed | passed |
| Flexural Strength |  |  |
| after 3 days | 46 kp/cm$^2$ | 43 kp/cm$^2$ |
| after 7 days | 53 kp/cm$^2$ | 52 kp/cm$^2$ |
| after 28 days | 67 kp/cm$^2$ | 72 kp/cm$^2$ |
| Compressive Strength |  |  |
| after 3 days | 216 kp/cm$^2$ | 223 kp/cm$^2$ |
| after 7 days | 275 kp/cm$^2$ | 272 kp/cm$^2$ |
| after 28 days | 387 kp/cm$^2$ | 411 kp/cm$^2$ |

Comparative, simultaneously effected concreting tests showed essentially improved workability in the concrete prepared from the cement with marl clinker content.

Cost saving (total energy consumption, personnel, investment interest): 29%.

EXAMPLE 2

In an oil-fired rotary kiln with a capacity of 1050 t/day, a Portland cement clinker of the composition 68.2% $C_3S$, 9.8% $C_2S$, 9.9% $C_3A$ and 7.4% $C_4AF$ (*) was burned. By means of a water-cooled pipe, marl with a particle size of 18 to 40 mm and the composition 21.4% ignition loss, 42.0% $SiO_2$, 19.6% $Al_2O_3$, 5.8% $Fe_2O_3$ and 25.1% CaO was charged into a zone about 1 meter from the kiln discharge end directly into the rotary kiln where it admixed with the hot clinker. The mixture then dropped onto the grate of a grate cooler and cooled off there. The amount of marl clinker charged into the kiln was 6700 kg/h, so that a weight ratio of Portland cement clinker of conventional composition to marl clinker of about 88:12 resulted. The clinker mixture thus obtained and a control sample of Portland cement clinker free of marl were tested, after grinding with crude gypsum rock in a cement tube mill with a capacity of 43 t/h, (closed circuit mill), according to Austrian Cement Standard ON B 3310, with the following results:

(*) $C_3S = 3$, $CaO.SiO_2$
$C_2S = 2\ CaO.SiO_2$
$C_3A = 3\ CaO.Al_2O_3$
$C_4AF = 4\ CaO.Al_2O_3.Fe_2O_3$

|  | Unmixed Portland Cement Clinker | Mixture of Portland Cement Clinker and Marl Clinker |
| --- | --- | --- |
| Normal Consistence in % | 27.0 | 28.0 |
| Begin of Setting h/min | 2/25 | 1/45 |
| End of Setting h/min | 3/05 | 2/25 |
| Soundness Test | passed | passed |
| Flow in cm | 20.0 | 20.1 |
| Flexural Strength kp/cm$^2$ |  |  |
| 1 day | 47 | 45 |
| 3 days | 56 | 53 |
| 7 days | 65 | 66 |
| 28 days | 73 | 75 |
| Compressive Strength kp/cm$^2$ |  |  |
| 1 day | 186 | 203 |
| 3 days | 278 | 288 |
| 7 days | 356 | 364 |

|  | Unmixed Portland Cement Clinker | Mixture of Portland Cement Clinker and Marl Clinker |
| --- | --- | --- |
| 28 days | 479 | 488 |

Cost saving (total energy consumption and personnel): 23%.

EXAMPLE 3

In a gas-fired rotary kiln with a capacity of 660 t/day, provided with planetary coolers, marl of the composition 25.7% ignition loss, 28.4% $SiO_2$, 15.5% $Al_2O_3$, 9.4% $Fe_2O_3$ and 43.1% CaO and a particle size of 3 to 10 mm was charged into the part of the kiln adjacent the planetary coolers by means of a screw. Due to the conical shape of this part of the kiln, the marl clinker raw material was conveyed to the inlet openings of the planetary coolers where it mixed with the hot clinker discharged from the kiln and entered the cooler together with the hot clinker. By the transfer of heat from the hot Portland cement clinker to the marl clinker raw material, an essential lowering of the temperature in the cooler was achieved. The amount added was so selected that a ratio of Portland cement clinker of conventional composition to marl clinker of 85:15 resulted. The clinker thus obtained and a control sample of Portland cement clinker free of marl clinker were ground under addition of 15% blast furnace slag with a mixture of crude gypsum rock/anhydrite. From these cements, concrete cubes of an edge length of 20 cm were formed (cement content 325 kg/m³, aggregate 0 to 25 mm, good particle size distribution curve, w/c = 0.55.)

|  | Unmixed Portland Cement Clinker | Mixture of Portland Cement Clinker and Marl Clinker |
| --- | --- | --- |
| Flow in cm | 35 | 38 |
| Compressive Strength |  |  |
| after 40 hours | 115 | 135 |
| 7 days | 307 | 319 |
| 28 days | 411 | 436 |

The simultaneous production of concrete covers labs showed much better workability of the concrete made from the cement with a marl clinker content. The formation of cracks in the hardened state was also noticeably reduced in this concrete.

When carrying out the process of the invention according to Example 3, energy consumption as compared to separate burning processes was lowered by 17%.

The mixed clinker produced according to the invention was of better quality than a mixed clinker obtained from clinkers produced in separate processes.

EXAMPLE 4

In a grate cooler arranged downstream from a rotary kiln with a capacity of 900 t Portland cement clinker per day, fly ash from a power plant was charged by means of a gravity tube. The fly ash was of the following composition: 41.0 percent by weight $SiO_2$, 24.7 percent by weight $Al_2O_3$, 3.9 percent by weight $Fe_2O_3$, 19 percent by weight CaO, 8.3 percent by weight ignition loss. About 8 percent by weight of fly ash in relation to the clinker were added. Due to the intimate contact between the hot Portland cement clinker leaving the rotary kiln and the fly ash, the ignition loss of the fly ash was lowered to 1.3 percent by weight. Such a reduction of the ignition loss could never be effected in separate burning or heating processes in a rotary kiln. The resulting mixture of Portland cement clinker and fly ash and a comparative mixture of Portland cement clinker and fly ash which had not previously been heated were charged with 5 percent by weight of crude gypsum rock each into a mill and ground to a fineness according to Blaine of 3400 cm²/g each. Of this material, standard mortar prisms according to Austrian Standard B 3303 were formed. The following results were obtained:

|  | Cements with heated fly ash | Cements with unheated fly ash |
| --- | --- | --- |
| Modulus of Elasticity after 50 freeze-thaw alternations in % of the initial value | 92 % | 46 % |

The heating of the fly ash according to the invention has thus virtually eliminated the detrimental effect of the unburned components of the fly ash on frost resistance.

Total saving in energy consumption over separate burning: 11%.

EXAMPLE 5

A rotary tubular cooler was arranged downstream from a lime burning kiln with a capacity of 50 t lime a day. In this rotary cooler, trass was charged by means of a conveyor screw in such a manner that an intimate contact between the hot lime and the trass was established. In a second test, a dolomitic marl of low calcium content was added instead of the trass. The weight ratio of burned lime to trass and of the lime to marl was 60:40 each. The resulting mixtures as well as a comparative mixture containing unheated trass were ground to equal fineness and tested according to Austrian Lime Standard B 3324.

|  | Lime and unheated trass | Lime and heated trass | Lime and heated marl |
| --- | --- | --- | --- |
| Compressive Strength (kp/cm²) after 7 days storage in the moisture chest, then in water | 42 | 85 | 77 |

Total saving in energy consumption over separate burning: 21%

EXAMPLE 6

In a grate cooler arranged downstream from a Portland cement clinker rotary kiln, perlite of a particle size of 0.2 to 1.0 mm was charged over a chute so that an intimate contact between the hot clinker and the perlite was established. By the heating process, the apparent density of the perlite was reduced to 0.9 to 1.1 g/cm³ due to expansion. With the lightweight fine sand/cement mixture thus obtained, it was possible to produce lightweight plasters, lightweight mortars and, in conjunction with conventional coarse-grained lightweight aggregates, lightweight concretes.

Very similar results were obtained with expansible slates or shales.

Total saving in energy consumption over separate heating or burning: 5%.

What is claimed is:

1. In a method for the production of a mixture to be utilized in the production of building materials comprising at least two heated inorganic components of components of differing composition, the first component being subjected to a heating process and the other component or components being heated to a temperature below the heating temperature of the first component, the improvement comprising the steps of:

heating the first component to a first temperature, the component being selected from the group consisting of Portland cement clinker of conventional composition, conventional lime, argilliferous lime, and dolomitic lime; and, adding the remaining components of the mixture sequentially to the first component to establish intimate contact between said remaining components and the first component while the first component is at or near said first temperature, said remaining components being heated to lower temperatures as compared to the first component, said first component being a Portland cement clinker of conventional composition and at least one of the said other components to be heated to lower temperatures as compared to the temperature of said Portland cement clinker of conventional composition is selected from the group consisting of felspars, oil shale residues, bauxites, laterites, trasses, volcanic rocks, and glasses, the said materials having pozzuolana properties imparted to silicate and aluminate qualities thereof by heating.

2. In a method for the production of a mixture to be utilized in the production of building materials comprising at least two heated inorganic components of differing composition, the first component being subjected to a heating process and the other component or components being heated to a temperature below the heating temperature of the first component, the improvement comprising the steps of:

heating the first component to a first temperature, the component being selected from the group consisting of Portland cement clinker of conventional composition, conventional lime, argilliferous lime, and dolomitic lime; and, adding the remaining components of the mixture sequentially to the first component to establish intimate contact between said remaining components and the first component while the first component is at or near said first temperature, said remaining components being heated to lower temperatures as compared to the first component, at least one of said other components to be heated to lower temperatures as compared to the temperature of the first component is at least one material which expands and thus reduces its apparent density during heating, said material being selected from the group consisting of clay with a propensity for expanding, expansible slate, expansible tuff, and expansible vermiculite.

3. In a method for the production of a mixture to be utilized in the production of building materials comprising at least two heated inorganic components of differing composition, the first component being subjected to a heating process and the other component or components being heated to a temperature below the heating temperature of the first component, the improvement comprising the steps of:

heating the first component to a first temperature, the component being selected from the group consisting of Portland cement clinker of conventional composition, conventional lime, argilliferous lime, and dolomitic lime; and, adding the remaining components of the mixture sequentially to the first component to establish intimate contact between said remaining components and the first component while the first component is at or near said first temperature, said remaining components being heated to lower temperatures as compared to the first component, at least one of said other components to be heated to lower temperatures as compared to the temperature of the first component is a material containing substances detrimental to quality and susceptible to burning, to conversion to the gaseous state, to conversion to vapor, and to change during heating, said material losing its quality-deteriorating properties during heating, said material being selected from the group consisting of fly ash having a high content in sulfur compounds and fly ash having combustible components.

4. A method for the production of a mixture to be utilized in the production of building materials comprising the steps of:

subjecting a burned lime to a calcination process, the burned lime being selected from the group consisting of conventional lime, argilliferous lime, and dolomitic lime; and, adding at least one marl clinker to said lime to heat said marl clinker to a temperature below the burning temperature of said lime subsequently to cooling of said lime, wherein under utilization of the heat applied in the burning process of said lime and liberated during the subsequent cooling of said lime at least one marl clinker raw material which can be made susceptible to hydration by heating is added to said lime selected from the group defined above, the marl clinker being selected from the group consisting of marls, lime marls, dolomitic marls, marl slates, shales, argilliferous marls, calciferous clays, phyllites, lime phyllites, and ultramafic rocks, intimate contact being established between the lime and the marl clinker.

* * * * *